United States Patent
Gandrud et al.

(10) Patent No.: US 7,182,583 B2
(45) Date of Patent: Feb. 27, 2007

(54) ELECTRO-HYDRAULIC POWER UNIT WITH A ROTARY CAM HYDRAULIC POWER UNIT

(75) Inventors: Michael D. Gandrud, Ames, IA (US); Torben Frederiksen, Augustenborg (DK); Hans Esders, Brokstedt (DE)

(73) Assignee: Sauer-Danfoss Inc., Ames, IA (US)

( * ) Notice: Subject to any disclaimer, the term of this patent is extended or adjusted under 35 U.S.C. 154(b) by 101 days.

(21) Appl. No.: 10/927,395

(22) Filed: Aug. 26, 2004

(65) Prior Publication Data

US 2005/0175479 A1     Aug. 11, 2005

Related U.S. Application Data

(60) Provisional application No. 60/542,379, filed on Feb. 6, 2004.

(51) Int. Cl.
*F04B 17/03*     (2006.01)
*H02K 9/19*     (2006.01)

(52) U.S. Cl. ............................ 417/371; 310/62; 417/32

(58) Field of Classification Search ................ 417/271, 417/366, 371, 372; 310/62
See application file for complete search history.

(56) References Cited

U.S. PATENT DOCUMENTS

| | | | | |
|---|---|---|---|---|
| 2,864,551 A * | 12/1958 | Heidorn et al. ............. | 417/271 |
| 3,434,656 A * | 3/1969 | Bellmer ...................... | 417/371 |
| 3,672,793 A * | 6/1972 | Yowell ........................ | 417/271 |
| 3,790,309 A * | 2/1974 | Volz ........................... | 417/368 |
| 4,529,362 A * | 7/1985 | Ichiryu et al. .............. | 417/271 |
| 4,729,717 A | 3/1988 | Gupta | |
| 5,141,402 A * | 8/1992 | Bloomquist et al. ........ | 417/356 |
| 5,181,837 A * | 1/1993 | Niemiec ..................... | 417/372 |
| 5,220,225 A | 6/1993 | Moon, Jr. | |
| 5,261,796 A * | 11/1993 | Niemiec et al. ............ | 417/371 |
| 5,320,501 A * | 6/1994 | Langosch et al. .......... | 417/357 |
| 5,354,182 A * | 10/1994 | Niemiec et al. ............ | 417/366 |
| 5,591,013 A | 1/1997 | Kawafune et al. | |
| 6,524,084 B2 * | 2/2003 | Neumair ..................... | 417/372 |
| 6,863,502 B2 * | 3/2005 | Bishop et al. .............. | 417/280 |

* cited by examiner

*Primary Examiner*—Michael Koczo, Jr.

(57) ABSTRACT

An electro-hydraulic power unit is disclosed that includes a housing filled with hydraulic fluid. A hydraulic power unit is disposed within the housing, the power unit having a mechanical power shaft. Additionally, an electric machine is disposed within the housing adjacent to the hydraulic power unit, the electric machine having a rotor secured to the mechanical power shaft of the hydraulic power unit. Hydraulic fluid within the housing passes over the electric machine, thus cooling the electric machine and providing for improved efficiency and performance.

24 Claims, 9 Drawing Sheets

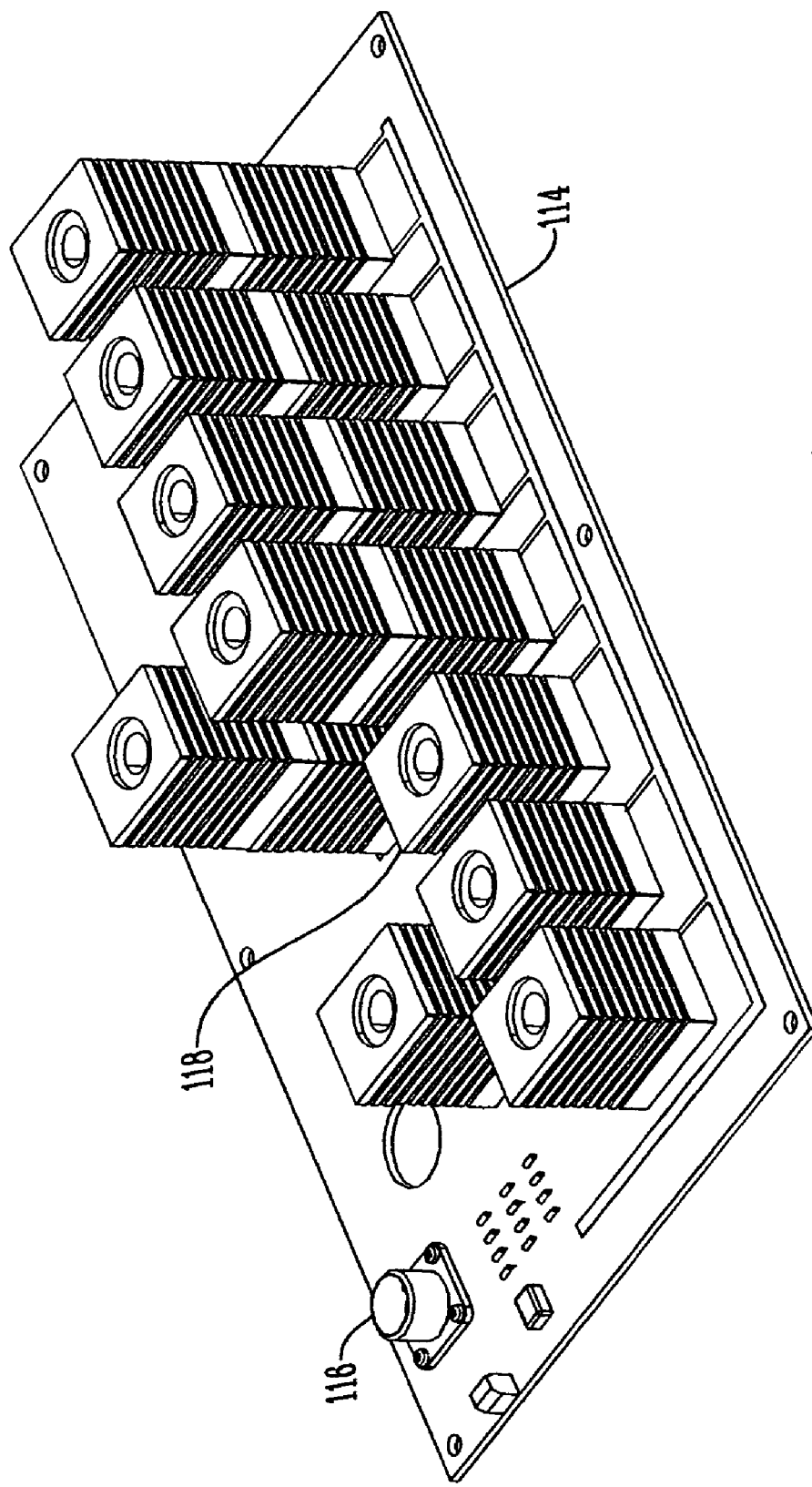

ELECTRO-HYDRAULIC POWER UNIT WITH A ROTARY CAM HYDRAULIC POWER UNIT

CROSS REFERENCE TO A RELATED APPLICATION

This application is a continuation of U.S. Provisional Patent Application Ser. No. 60/542,379 filed Feb. 6, 2004.

BACKGROUND OF THE INVENTION

The present invention relates to an electrical-hydraulic fluid power converter. More specifically, the present invention relates to a device that includes an electric machine coupled to a hydraulic machine.

In material handling and other related fields, lift trucks are often used for transporting heavy materials. Such trucks often use a large lead acid storage battery or similar device as a source of electrical power. Lift trucks also typically use a system of hydraulic cylinders for the purpose of raising, lowering, tilting, reaching, shifting, and other load manipulation functions. With conventional trucks, it is common to use a battery powered electric motor to turn a hydraulic pump. With this system, hydraulic pressure and flow are produced by the pump and are modulated through a system of valves that are fluidly connected to a series of hydraulic cylinders for moving the payload.

In the prior art, the use of various direct current electric motors is well known. Recent developments in the art of solid state power electronics have enabled the use of alternating current (AC) motors to perform various functions within industrial trucks. Such AC motors and their solid state controls provide several advantages in industrial trucks which are well known in the art.

Additionally, the use of electric motor coupled with a hydraulic pump is well known in the art. An example of a prior art electro-hydraulic power converter is disclosed by U.S. Pat. No. 5,591,013 to Kawafune et al. The Kawafune et al. patent, as well as the prior art cited therein, discloses a swash plate type axial piston pump disposed within the center of the rotor of an electric motor. Advantages and disadvantages of this design are apparent to persons skilled in the art.

The present invention improves on Kawafune et al. by teaching a device which places a rotary cam type hydraulic machine, such as a hydraulic piston unit or more specifically a pump, adjacent to and within the same housing as the electric machine. To further improve upon Kawafune et al., a rotary cam type piston hydraulic power unit is used. The best known forms of rotary cam type hydraulic power machines are the wobble plate pump and the radial piston pump. Other variations of the rotary cam hydraulic power units could optionally be used in the present invention.

The present invention seeks to build upon recent developments in the field of electric motors and related components for battery powered industrial trucks. The present invention accomplishes this goal by teaching an electro-hydraulic power converter with a rotary cam hydraulic power unit that improves efficiency, lowers cost, reduces size, simplifies installation, and increases reliability.

It is therefore a primary object of the present invention to teach an electro-hydraulic power converter including a rotary cam hydraulic power unit that has improved efficiency, reduced cost, decreased size, simplified installation, and improved reliability.

It is yet another object of the present invention to provide such a unit where the housing is flooded with hydraulic fluid to provide cooling and lubrication to the electric motor and pump components.

Still another object of the present invention is to provide an integrated unit which incorporates power electronics to control the operation of the electric motor. These controls may optionally take the form of a three phase AC inverter.

Another object of the present invention is to provide a unit which optionally incorporates solenoid or other valves within the unit for the purpose of controlling and adjusting the performance of the hydraulic loads that are powered by the unit.

Still a further object of the present invention is to provide a unit where individual power unit cylinders or clusters of power unit cylinders are assigned to specific functions of a vehicle. For instance, if the unit has nine cylinders total, six cylinders may be connected to provide hydraulic fluid to the main lift cylinder of the industrial truck and the remaining three cylinders may be used to provide flow to the tilt, shift, reach, grab, steering or other auxiliary functions of the vehicle.

These and other objects will be apparent to those skilled in the art.

BRIEF DESCRIPTION OF THE INVENTION

An electro-hydraulic power unit is disclosed that includes a housing filled with hydraulic fluid. A hydraulic power unit is disposed within the housing, the power unit having a mechanical power shaft. Additionally, an electric machine is disposed within the housing adjacent to the hydraulic power unit, the electric machine having a rotor secured to the mechanical power shaft of the hydraulic power unit. Hydraulic fluid within the housing passes over the electric machine, thus cooling the electric machine and providing for improved efficiency and performance.

BRIEF DESCRIPTION OF THE DRAWINGS

FIG. 5 depicts an electro-hydraulic power unit of the present invention with a printed circuit board for electronically connecting solenoid coils and other electronic control components;

DESCRIPTION OF THE PREFERRED EMBODIMENTS OF THE INVENTION

Figure 1:
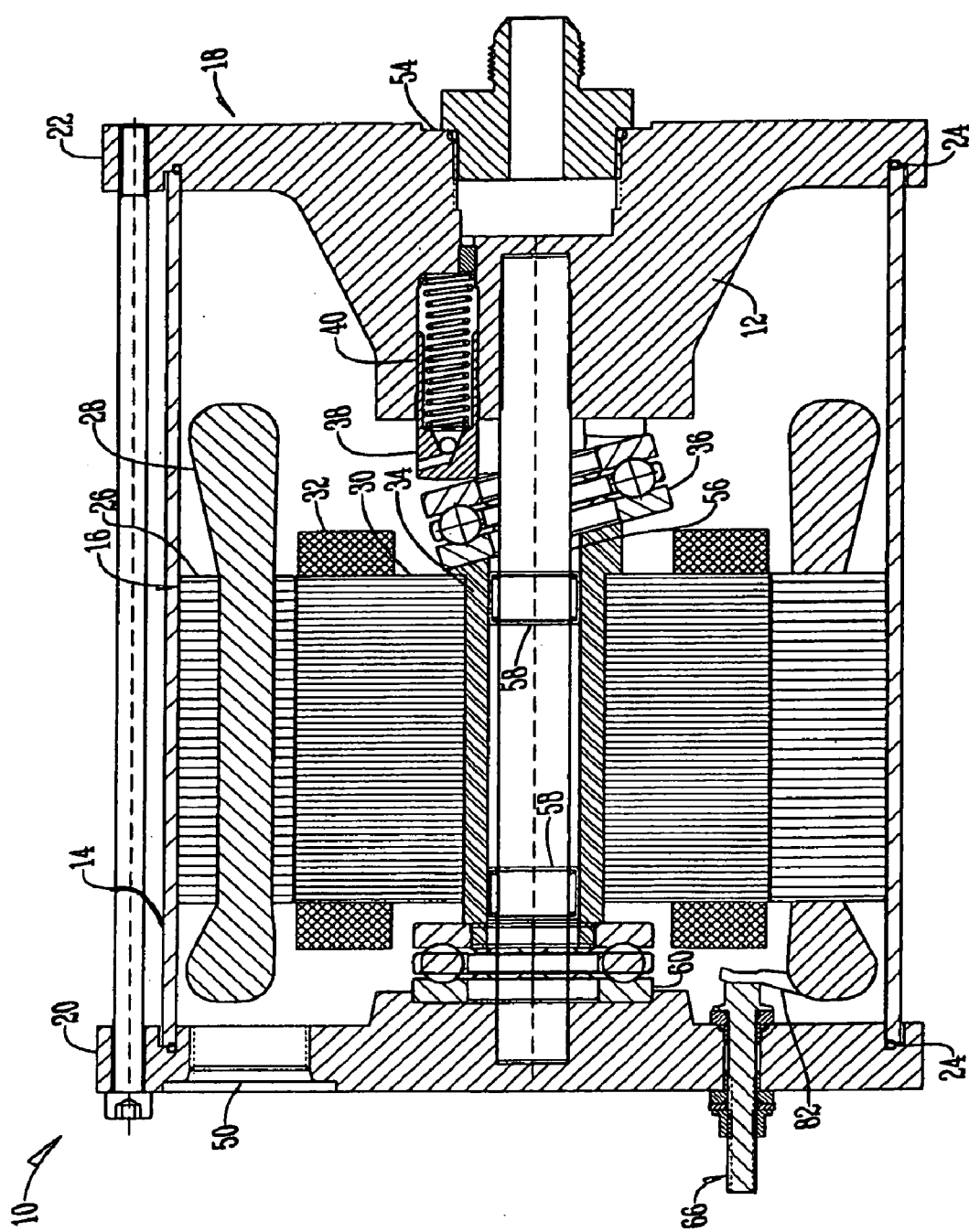
FIG. 1 depicts a cross sectional view of the first embodiment of the present invention.

With reference to FIG. 1, an electro-hydraulic power converter 10 is disclosed with a rotary cam hydraulic power unit 12. This unit 12 includes a housing 14, an electric machine 16, and a hydraulic machine 18.

The housing 14 preferably is a steel tube and is substantially flooded with hydraulic fluid. End caps 20 and 22 are fitted against housing 14, thus forming a complete housing for the rotary cam hydraulic power unit 12. The tube is preferably sealed to the end caps with one or more elastomeric O-rings 24.

The electric machine 16, which also is known as an electric power means, preferably is an alternating current (AC) induction motor, but may be any conventional electric machine, including: an alternating current (AC) machine; a direct current (DC) machine; an induction machine; a single phase machine; a three phase machine; a polyphase machine; a switched reluctance machine; a written pole machine; a permanent magnet alternating current (PMAC) machine; a permanent magnet direct current (PMAC) machine; a shunt wound machine; a series wound machine; a compound wound machine; a synchronous machine; a separately excited machine; a brushless machine; a brushed machine; a brushless direct current machine; and a transversal flux machine.

The electric power means 16 is controlled and optionally caused to turn at a desired speed and direction by an electronic controller (not shown). This electronic controller is preferably a three phase alternating current inverter. For simplicity this inverter may be designed as a variable voltage/variable frequency inverter. For improved accuracy of control, the inverter is preferably a vector type or field oriented controller type inverter. The inverter (not shown) preferably contains solid state power switches which are pre-assembled into a power module. The inverter is preferably integrated with the electro-hydraulic power unit described herein. Alternatively, the inverter may optionally be remotely mounted from the device of the present invention.

As shown in FIG. 1, the electric power means 16 includes a stator 26, a stator winding 28 composed of a series of conductive wires, a rotating portion known as a rotor 30, a set of conductors installed on the rotor comprising a so-called "squirrel cage" assembly 32, and a shaft 34. The stator 26 preferably is press-fit into the housing 14. The rotor 30 includes a shaft 34 which has an inclined surface. Provision is made to attach a thrust bearing 36 to the inclined surface of the shaft 34. As the rotor 30 rotates, the thrust bearing 36 will "wobble" with respect to the shaft 34.

Figure 3:
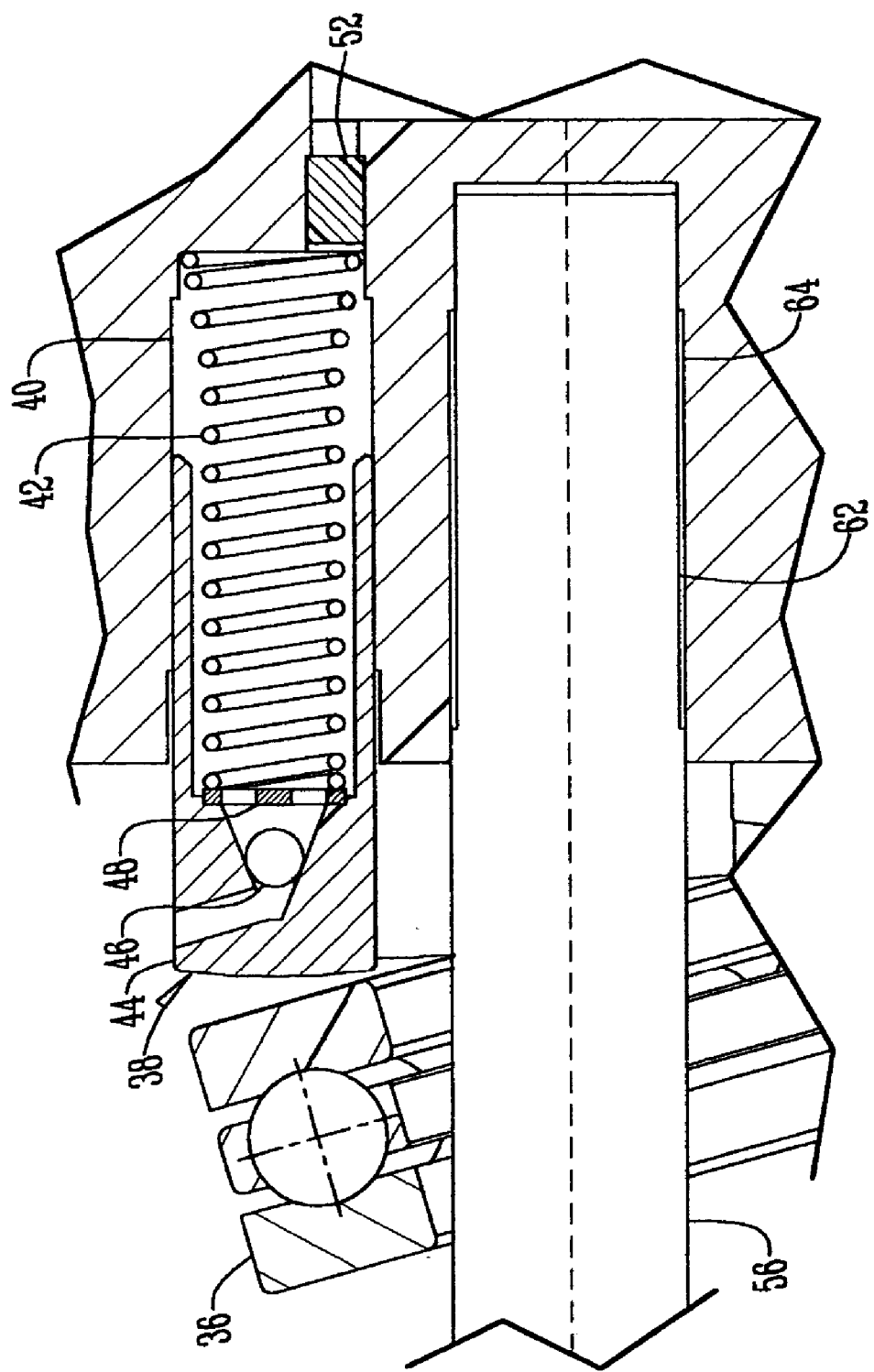
FIG. 3 depicts a sectional view of the axial piston of the first embodiment of the present invention.

The hydraulic machine 18, as shown in FIG. 1, is an inclined surface axial piston unit. One form of such a unit is known as a wobble plate pump. The wobbling motion of the thrust bearing 36 will sequentially press each piston 38 into the respective cylinder bore 40. A spring 42, as best shown in FIG. 3, is provided within the cylinder bore 40 to press the piston 38 back out of the cylinder bore 40. In this manner, the pistons 38 are caused to reciprocate in and out of the cylinder bores 40 as the rotor 30 and thrust bearing 36 rotate.

As shown in FIG. 3, each piston 38 is provided with an inlet check valve 44. Alternatively, an inlet check valve could be provided in the end cap 22. The check valve comprises a ball 46 within a conical bore of the piston 38. A retainer plate 48 is provided to retain the ball 46. The hydraulic machine 18 functions by producing a reciprocating movement of the pistons whereby fluid is drawn from within the housing into the cylinder bore 40 through an inlet check valve 44. Fluid is allowed to enter the housing through inlet fluid connection 50. In this arrangement, the fluid is preferably drawn across the electric power means 16, thus cooling and lubricating the electrical components.

Additionally, each cylinder bore 40 is provided with an outlet check valve 52. The outlet check valves 52 are grouped together depending upon the application. For instance, if the unit has nine total cylinders 40, six cylinders 40 might be connected to provide hydraulic fluid to a lift cylinder of an industrial truck while the remaining three cylinders 40 are used to provide flow to tilt, shift, reach, grab, steering or other functions of an industrial truck. The rotary cam hydraulic power unit 12 of FIG. 1 discloses one way of grouping the output flows from a selected plurality of outlet check valves 52. A bore 54 of suitable diameter is provided to manifold together the desired cylinders 40. The bore 54 is provided with a thread and an O-ring boss to allow the bore 54 to either be opened or closed.

An axle type shaft 56 is provided to keep the rotor 30 centered within the bore of the stator 26. Bearings 58 preferably of a needle roller type are pressed into the rotor shaft 56 and provide for rotation of the rotor 30 about the axle 56. A second thrust bearing 60 is provided to counteract the longitudinal forces which are imposed on the rotor 30 by the first thrust bearing 36.

The axle 56 is press fit into the end cap 22. If this press fit operation is done with an axle 56 and end cap 22 of ordinary geometry, the pressing operation will result in an undesired distortion of the cylinder bores 40, which may interfere with the operation of the pistons 38. To prevent this interference, the axle shaft 56 is provided with a reduced diameter region 62, as shown in FIG. 3. The axle shaft 56 with reduced area region 62 is pressed into a bore 64 in the end cap 22. By providing the reduced diameter region 62, two regions of contact are maintained in the press fit of the shaft and the bore. By limiting the press fit and the associated distortion to the two regions of contact, the distortion which is associated with the press fit operation is limited only to the contact regions and kept away from areas where the distortion would cause the piston 38 to possibly stick within the cylinder bore 40.

Figure 4A:
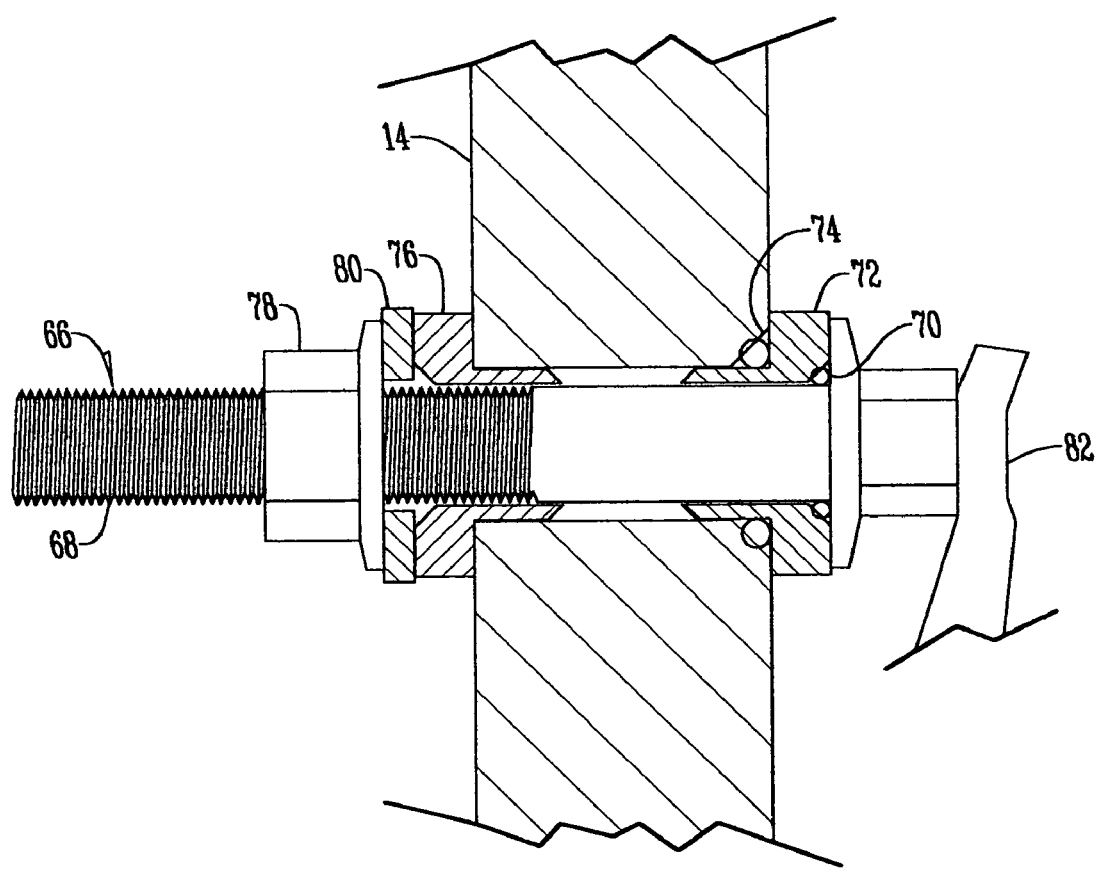
FIG. 4A depicts a means of connecting power conductors through the housing of the present invention.
Figure 4B:
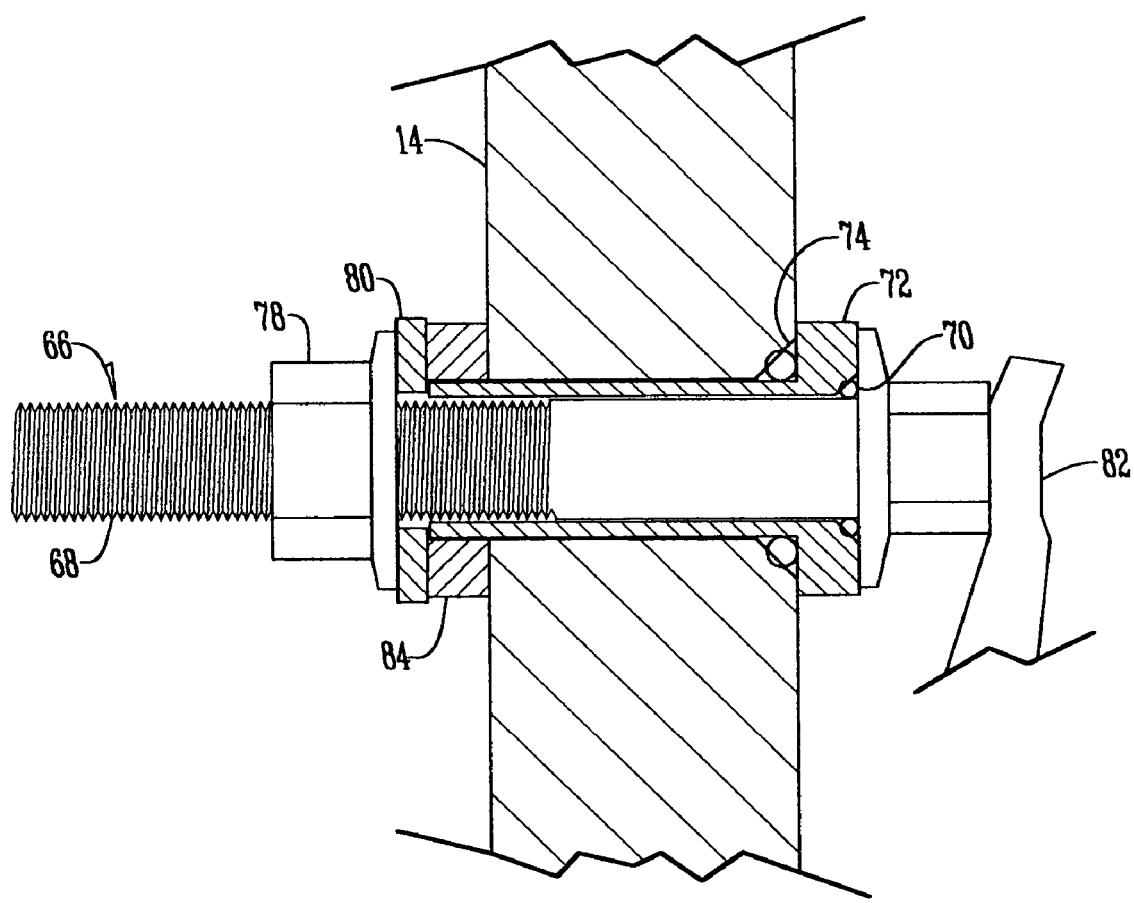
FIG. 4B depicts a further means of connecting power conductors through the housing of the present invention.
Figure 4C:
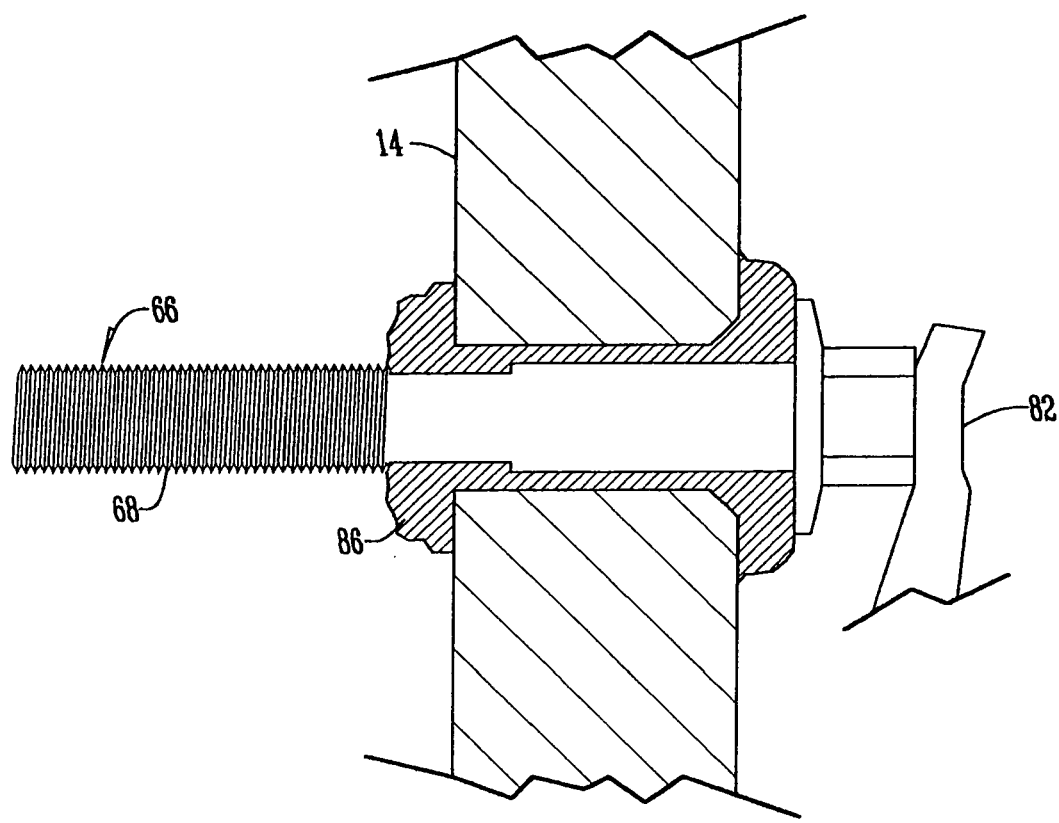
FIG. 4C depicts a conventional type of conductor.

An electric power conductor 66 passes through the end cap 20 of the housing 14. Conductor 66 provides a means of passing electrical connections through the housing 14 while sealing against leakage of hydraulic fluid and at the same time electrically insulating the conductor 66 from the end cap 22 of the housing 14. As shown in FIGS. 4A–4C, the conductor 66 includes a metallic bolt 68, which is preferably composed of brass. As shown in FIG. 4A, the bolt 68 compresses a first smaller elastomeric O-ring 70 against an insulating bushing 72. The conductor 66 further compresses a second larger elastomeric O-ring 74 against the end cap 22. A second insulating bushing 76 secures against the opposite side of the end cap 22 by a threaded nut 78. A washer 80 is optionally disposed between second insulating bushing 76 and nut 78. Wires 82 connect the conductor 66 to the stator winding 28. The wires are attached to bolt 68 by soldering, spot welding, or brazing processes. Preferably, a first wire terminal (not shown) is spot weld to the winding 28 and a second wire terminal (not shown) is spot weld to the conductive brass bolt 68. Wires 82 then connect the two wire terminals.

Alternatively, as shown in FIG. 4B, the first bushing 72 completely extends through the end cap 22 of housing 14. Additionally, the second bushing 84 takes on the form of a washer and presses against the outside of end cap 22. As shown in FIG. 4C, a conventional type of conductor 66 is shown, whereby a glass substance 86 is melted around bolt 68 to form a fluid tight insulating seal between the conductor 66 and the end cap 22.

Figure 2:
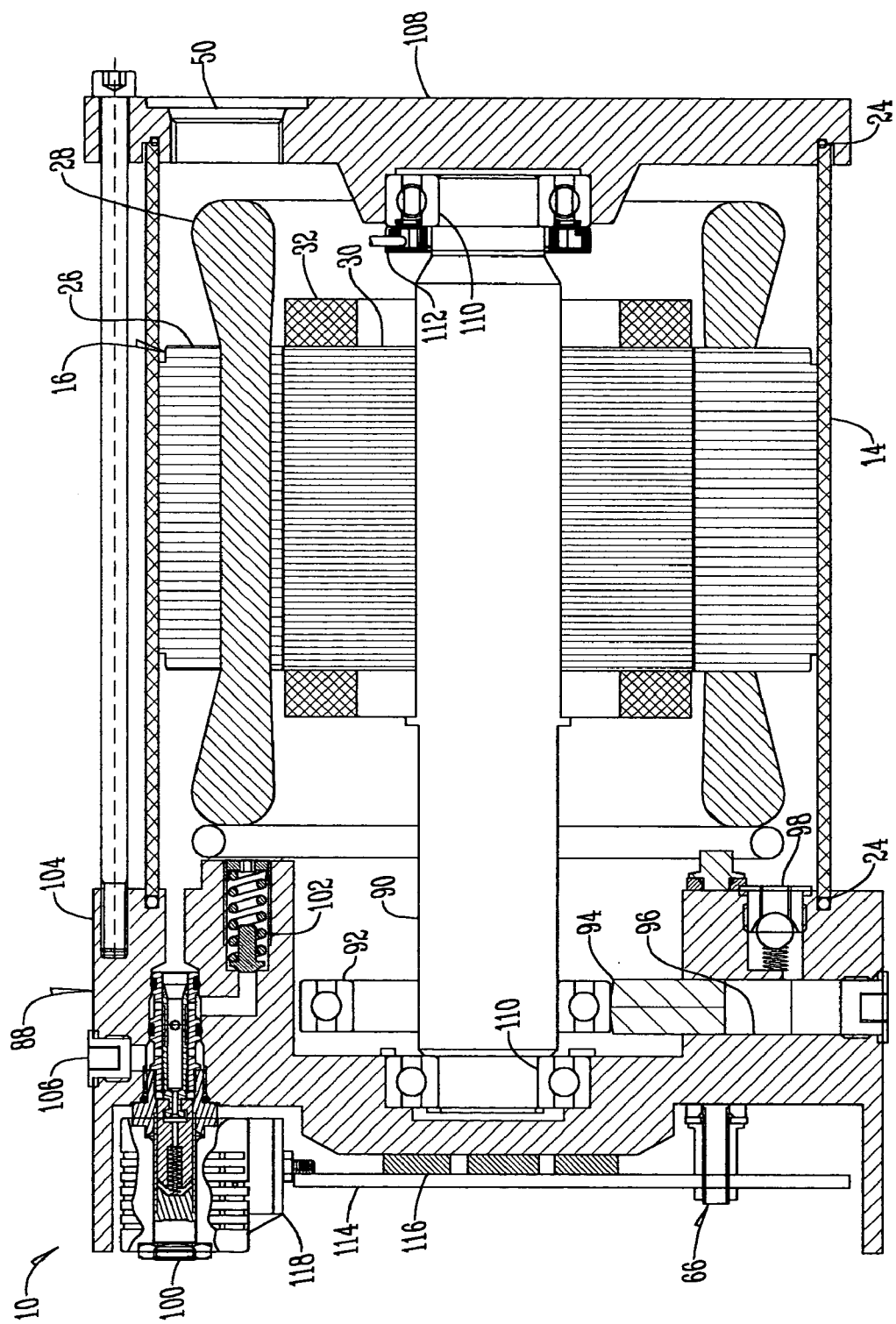
FIG. 2 depicts a cross sectional view of the second embodiment of the present invention.

FIG. 2 depicts an alternate embodiment of the electro-hydraulic power converter 10 that utilizes a radial piston pump 88. Radial piston pump 88 includes a shaft 90 onto which a bearing 92 is secured. As the shaft 90 turns, the eccentrically-fitted bearing 92 causes piston 94 to reciprocate in and out of the bore 96. Alternatively, as shown in FIG. 2, an inlet check valve 98 is fluidly connected to the cylinder bore 96. As the piston 94 reciprocates into the bore 96, an outlet check valve (not shown) vents hydraulic fluid to either a hydraulic solenoid valve 100 or directly to an outlet of the piston pump 88. When a solenoid valve 100 is used, the solenoid valve 100 selectively connects the fluid to a hydraulic load or returns the fluid to the housing 14. When desired, a relief valve 102 is integrated directly within the end cap 104. A plurality of pump outlet ports 106 is provided to supply fluid to external loads.

The electric power means 16 of the alternate embodiment of the electro-hydraulic power converter 10 functions in much the same manner as the embodiment of FIG. 1. The end cap 108 encloses the housing 14 and retains the bearing 110, which ensures that the rotor 30 is centered within the stator 26. A speed sensor 112 is optionally installed. The speed sensor 112 is preferably a speed sensing bearing. Hydraulic fluid enters the piston pump 88 through the fluid inlet 50 and passes over the electric power means 16, thereby cooling the electric components.

The alternate embodiment of the electro-hydraulic power unit 10 includes a printed circuit board 114 which is attached to the end cap 104 and electrically connected to the electric power means 16 via conductor 66. Power electronics 116 are installed between the circuit board 114 and the end cap 104. Solenoid coils 118 are optionally attached or connected to the circuit board 114. These coils can be directly machine soldered or may have lead wires or integrated connectors. The circuit board 114 may include super capacitors, ultra capacitors, gold capacitors, or Aerogel capacitors. Additionally, an overload protection fuse may be incorporated into the circuit board 114. Suitable fuses type CNL or type CNN fuses manufactured by Littelfuse.

When multiple solenoid valves 100 are used, it is important to improve reliability and reduce manufacturing cost of the interconnection wires that transmit electrical control signals to the coils 118. To this end, solenoid coils 118 are mounted to a single printed circuit board 114, as best shown in FIG. 5. The solenoid coils 118 can be soldered automatically to the printed traces of a circuit board 114, thereby interconnecting the devices at a great cost savings over conventional wiring harnesses. Additionally, when solenoid coils 118 are mounted directly to a printed circuit board 114 in this manner, other power components 116 can be provided on the same board for control of the solenoid coils 116. For instance, a controller area network (CAN) circuit can be connected to the circuit board 114 for controlling multiple solenoid coils 116. This arrangement eliminates the need for a wire harness of many wires which would otherwise be needed to connect a series of valves to a central controller.

Figure 6:
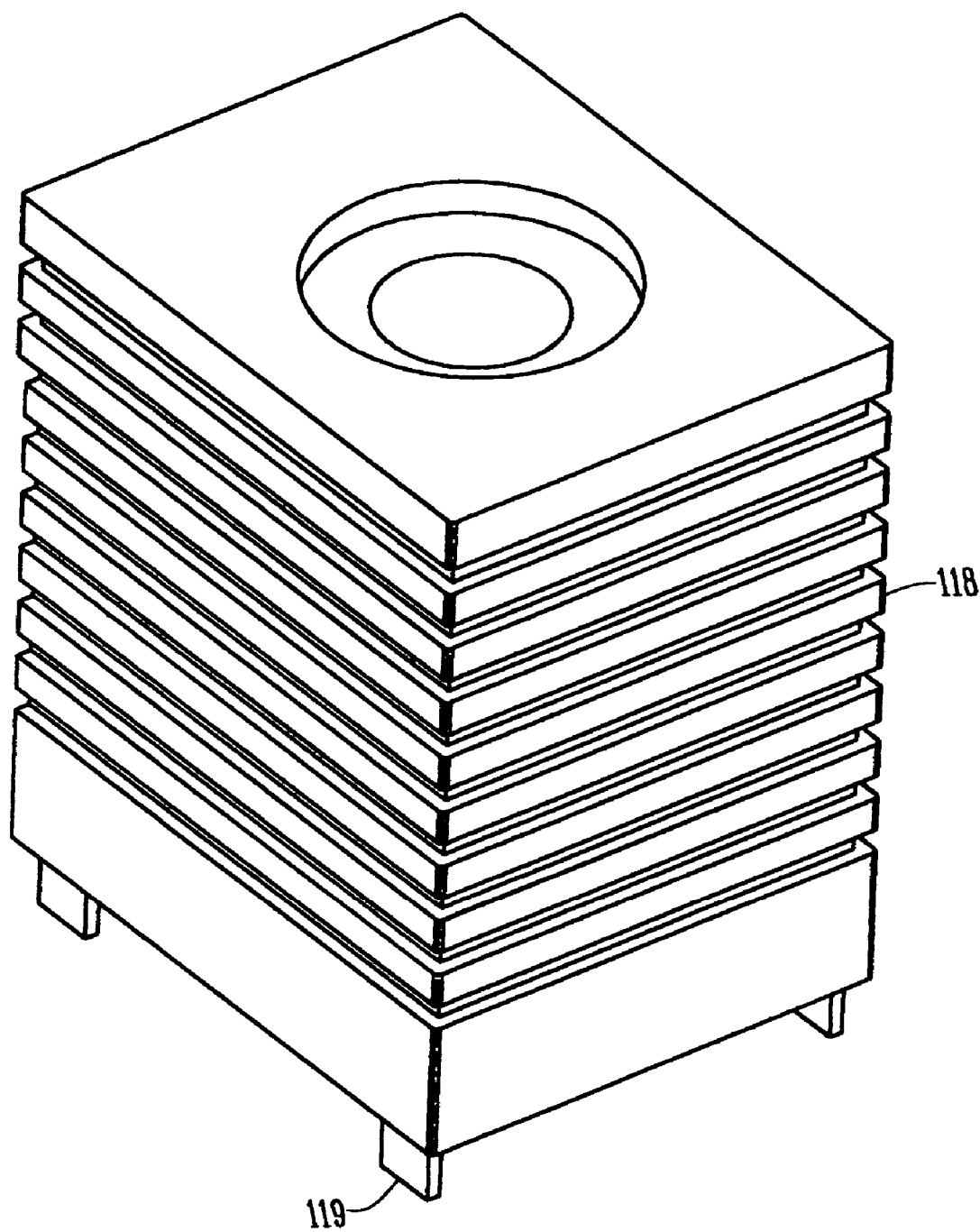
FIG. 6 depicts a solenoid coil for use with the printed circuit board of the invention of FIG. 5.

One possible design for a solenoid coil 118 is shown in FIG. 6. Solenoid coil 118 differs from coils of conventional design in that solderable pins 119 are provided for electrical and mechanical attachment to the circuit board 114. Both single and double coil solenoids of this design are contemplated, as shown in FIG. 5.

Figure 7:
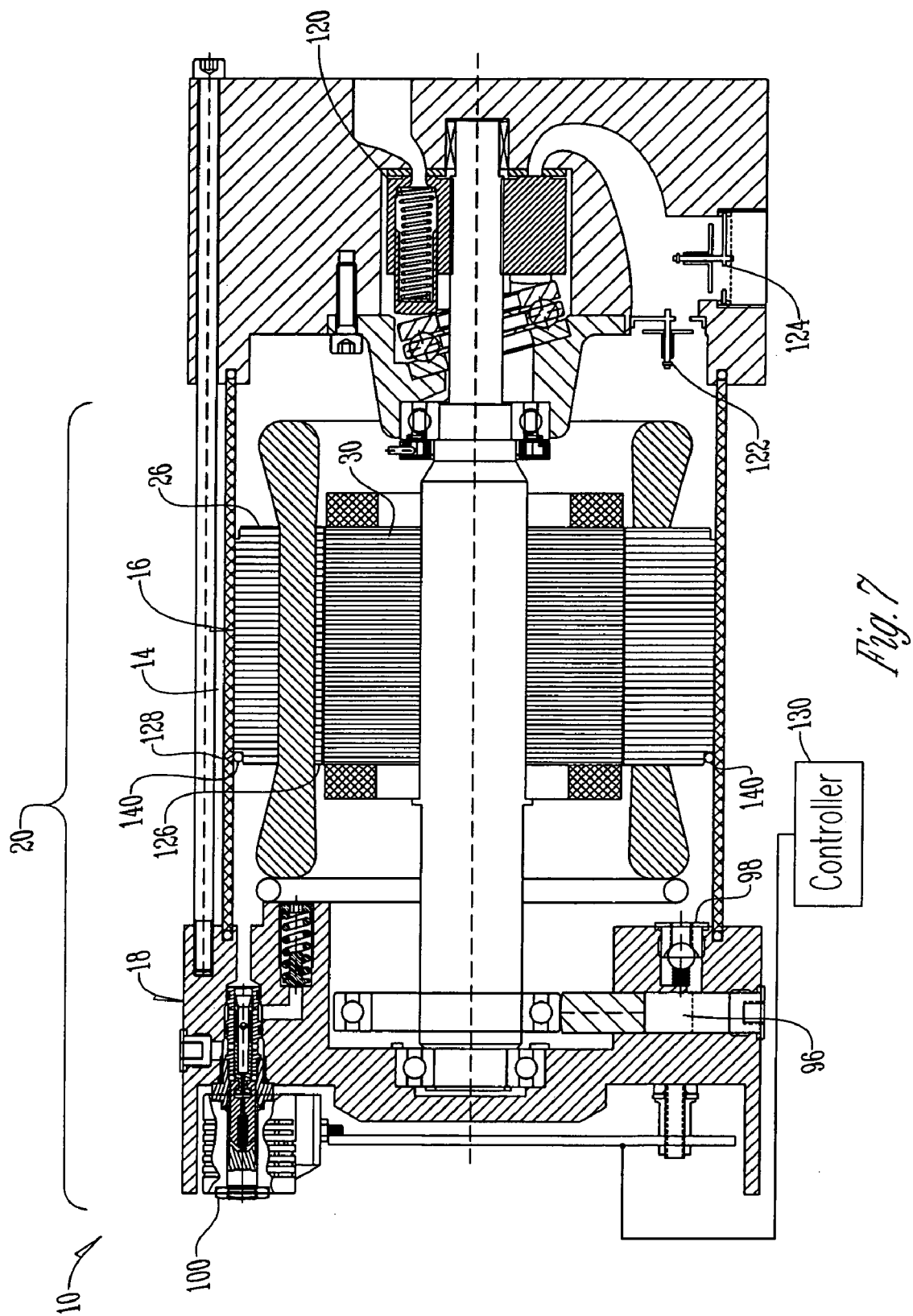
FIG. 7 depicts an electro-hydraulic power unit of the present invention that includes two hydraulic machines.

Either embodiment of the electro-hydraulic power unit 10 may include multiple hydraulic machines 18. As shown in FIG. 7, one end of the unit 10 incorporates a rotary cam hydraulic power unit 18, similar to the unit of FIG. 2, and the opposite end of the unit 10 incorporates a more traditional swashplate type axial piston pump 120.

Additionally, in improving the cooling of the electro-hydraulic power unit 10, check valves 122 and 124 may be installed to direct the fluid flow, as shown in FIG. 7. Such valves may be controlled by any conventional controller (not shown), such as the devices in U.S. Pat. Nos. 5,190,446 and 5,259,738. In a similar manner, check valves 122 and 124 may be replaced with one or more thermally operated valves (not shown).

Persons skilled in the art will see that the power unit 10 of FIG. 7 may be operated in a first pumping mode where the unit 10 functions as a pump. The unit 10 of FIG. 7 may also be operated in a second motoring mode. In the pumping mode the unit is used to supply power to a load such as lifting a load that is connected to a hydraulic cylinder. In the second motoring mode the unit of FIG. 7 is used to absorb power from a load. Check valves 122 and 124 are optionally provided to improve operation when the power unit 10 of FIG. 7 is operated in these two modes. When operating in the pumping mode, check valve 124 opens thus allowing the unit to draw hydraulic fluid from a hydraulic reservoir. In the pumping mode check valve 122 will remain closed. During the motoring mode, fluid is returned from the pumping element 120 to the rotary cam hydraulic power unit 18. In the motoring mode, check valve 124 will close and check valve 122 will open. The opening of check valve 122 allows this returning hydraulic fluid to flush through the housing of the power unit 10.

For better operation, it is desirable for the electric machine 16 to be surrounded with hot oil or hydraulic fluid in order to lower frictional losses while not allowing the oil to overheat. In a hydraulic system with normal duty cycle, the oil temperature never exceeds 100° C. Therefore the motor will be cooled by the oil and its overload capability will be slightly improved. Also a slight increase in efficiency may be expected.

The oil or hydraulic fluid in the small gap 126 (FIG. 7) between rotor 30 and stator 26 will cause some power loss, which will increase with speed. Most electro-hydraulic units 10 are designed for a medium speed range instead of maximizing the speed. But when the hydraulic fluid is cold upon starting up the electro-hydraulic unit 10, the power loss can easily increase ten-fold, even at moderate speed. One solution to this problem is to minimize the oil flow through the air gap 126. As such, the oil heats up immediately and the power loss decreases to an acceptable level. But this solution does not allow the motor to be cooled by the oil as mentioned before. Additionally, localized overheating of the oil may occur.

Therefore, the best way to allow the oil to cool the electric machine 16 is to direct the suction flow of the hydraulic machine 18 through the rotor-stator gap 126. This guarantees a permanent exchange of the hydraulic fluid in the gap 126. With this solution, the heating of the whole oil in the startup phase is completely done by friction in the gap 126. In a normal system, the heating occurs through the unavoidable losses of all involved components over a longer period of time. During this phase, the available output power of the electro-hydraulic unit 10 is dramatically reduced.

Both embodiments of the electro-hydraulic unit 10 maintain the benefits of oil cooling for the electric machine 16, but minimize power loss in the start up phase. This is done by forcing the hydraulic fluid only through the gap 126 between the rotor 30 and the stator 26 when the hydraulic fluid is already hot. This is accomplished by a bypass channel 128, through which cold oil passes until the electric machine reaches operational temperature. The bypass channel 128 preferably is a co-axial nut in the housing 14, which forms a channel together with the stator 26. The cold oil will not flow through the gap 126 during the start up phase because of higher flow resistance.

When the oil becomes hot, the bypass channel 128 closes by a thermal expansion element 140. The expansion mechanism 140 preferably is a bi-metallic element mounted on the stator 26, but also may comprise an embedded piece of wax that deforms with temperature. The closing of the bypass channel 128 forces the oil to run through the gap 126 of the electric machine 16. It is not required that the bypass channel 128 close completely to shift flow, but rather just enough to increase the flow resistance through the bypass channel 128 to a value higher than through the gap 126.

Additionally, a controller 130 (FIG. 7) may be utilized that controls the speed of the electro-hydraulic unit 10 such that sufficient cooling of the electric machine 10 by the hydraulic fluid occurs. The electric machine 10 includes various switches 116 (FIG. 2) that will malfunction or may degrade at excessive temperatures. As long as the unit 10 is operating at a sufficient speed, hydraulic fluid passes over the electric machine 16 at a rate sufficient to cool the electric machine 16 and the solid state switches. If the unit 10 operates at too slow of a speed, the rate of flow of the hydraulic fluid over the electric machine 16 is insufficient. Likewise, if the unit 10 operates at too high of a speed, the hydraulic fluid cannot effectively cool the electric machine 16. Therefore, the controller 130 monitors both the speed of the unit 10 and the temperature of the electric machine 16 and regulates the speed to ensure proper cooling.

Alternatively, the temperature of the electric machine 16 may be controlled by regulating the amount of electrical current flowing therein. The temperature of the electric machine 16 is proportional to the current flowing therein. Therefore, the controller 130 may be adapted such that it regulates the maximum value of electrical current flowing through the electric machine 16. The controller 130 may also take the speed of the unit 10 and the temperature of the electric machine 16 as factors. Additionally, a controller 130 is optionally used to control the speed and/or current of the electro-hydraulic unit 10 such that sufficient cooling of the electric machine 16 by the hydraulic fluid occurs. The electric machine 16 includes varnished or otherwise insulated copper windings as well as solid state power switches (not shown). These parts will malfunction or degrade at excessive temperatures.

FIG. 7 also provides for the use of a bearing housing 132 having a tapered side wall 134 that houses the thrust bearing 36 of the present invention. One skilled in the art will understand that this housing could be used on any type of bearing. By having a bearing housing 132 with a tapered side wall 134 the thrust bearing 36 is located in a bell shaped bearing housing. This design allows for simplification of the design of the hold down mechanism. The bell shaped bearing housing 132 also has bores 136 to allow oil to pass through the housing 132. The housing 132 optionally can be integrated into the end cap. Because of the bell shape, the housing 132 is able to conduct forces. Additionally, sealings or porting channels are required as would be in a typical housing. Therefore, the cost is low compared to traditional bearing housings and at the same time does not sacrifice the space of a normal bearing housing. Therefore, not as much material is needed when designing the shaft and housing, the shaft defluxion is more or less completely eliminated, and a significant reduction of radiated noise can be expected due to the very small surface area of vibrating parts and due to the shaft being completely surrounded by oil. Thus, the bell shaped housing 132 provides many advantages.

Persons skilled in the art will see additional benefit in having the ability to direct the suction flow of the hydraulic power unit alternatively along a path based on operating conditions. In particular, it is desired to selectively direct flow on the basis of unit or oil temperature. More specifically, it is desirable to provide a means of controlling the temperature of the hydraulic fluid in the rotor-stator gap 126. This is accomplished by providing a means for oil to arrive at the inlet of the pump without flushing oil through the gap 126. This allows the oil in the gap 126 to heat up to an extent that will reduce viscous losses without heating to the point that would cause degradation in the oil or thermal damage to the motor. This is accomplished in one embodiment by provided a bi-metallic element 140 to allow oil to bypass around the stator-rotor gap 126. Alternatively, a wax capsule thermostat or solenoid valve is provided.

Persons skilled in the art will see benefit in providing additional thermal management capabilities to the power unit of the present invention. A mode of operation of the power unit is therefore taught where the power unit temperature is sensed and a controller selectively operates the power unit at a reduced power mode when excessive temperatures are detected. Alternatively, the system controller can estimate temperature based on the history of recent operation and reduce operating power when excessive temperatures are anticipated.

It is therefore seen that through the integration of an electric machine and a hydraulic machine in a single housing, and further by immersing the electric machine in hydraulic fluid, an improved electro-hydraulic unit is achieved that improves efficiency, lowers cost, reduces size, simplifies installation, and increases reliability.

What is claimed is:

1. An electro-hydraulic power unit comprising:
 a housing;
 a hydraulic power unit within the housing, said power unit having a mechanical power shaft; and
 an electric machine within the housing adjacent to the hydraulic power unit, said electric machine having a rotor secured to the mechanical power shaft of the hydraulic power unit and a stator press-fit into the housing, wherein there is a rotor-stator gap between the rotor and the stator and a bypass channel between the stator and the housing, wherein the temperature of suction flow through the rotor-stator gap is controlled by directing suction flow through the bypass channel when the power unit is operating below a selected temperature and directing suction flow through the rotor-stator gap when the power unit is operating above the selected temperature.

2. The electro-hydraulic power unit of claim 1 further comprising a controller in electronic communication with the electric machine to limit the amount of electrical current flowing through the electric machine.

3. The electro-hydraulic power unit of claim 1 wherein the housing is flooded with hydraulic oil for cooling the electric machine.

4. The electro-hydraulic power unit of claim 3 further comprising a controller for regulating the speed of the hydraulic machine and thereby the flow of the hydraulic fluid over the electric machine.

5. The electro-hydraulic power unit of claim 1 wherein the hydraulic power unit is a wobble plate rotary cam hydraulic pump.

6. The electro-hydraulic power unit of claim 1 wherein the hydraulic power unit is a radial piston rotary cam hydraulic pump.

7. The electro-hydraulic power unit of claim 1 wherein the electric machine is selected from the group consisting of: an alternating current (AC) machine; a direct current (DC) machine; an induction machine; a single phase machine; a three phase machine; a polyphase machine; a switched reluctance machine; a written pole machine; a permanent magnet alternating current (PMAC) machine; a permanent magnet direct current (PMAC) machine; a shunt wound machine; a series wound machine; a compound wound machine; a synchronous machine; a separately excited machine; a brushless machine; a brushed machine; a brushless direct current machine; and a transversal flux machine.

8. The electro-hydraulic power unit of claim 1 further comprising a second hydraulic power unit adjacent to the electric machine and connected to the mechanical power shaft.

9. The electro-hydraulic power unit of claim 1 further comprising a conductor element for passing electrical power through the housing, the conductor comprising:
   insulating elements received by a passage extending through the housing;
   a terminal bolt passing through the insulating elements;
   a means of sealing the terminal bolt and insulating elements to the housing; and
   a fastening nut secured to the terminal bolt compressing the sealing means to seal against fluid flow through the passage.

10. The electro-hydraulic power unit of claim 1 wherein the mechanical power shaft has a reduced diameter portion that secures to the housing.

11. The electro-hydraulic power unit of claim 1 further comprising:
   a plurality of hydraulic valves moveably received within the housing;
   a circuit board; and
   solenoid coils secured to the circuit board and operatively connected to the hydraulic valves to permit the valves to be controlled by the solenoid coils.

12. The electro-hydraulic power unit of claim 11 wherein the solenoid coil comprises:
   a plurality of pins connected to the solenoid coil for securing the coil to the circuit board; and
   means for securing the solenoid coil to the hydraulic valve.

13. The electro-hydraulic power unit of claim 1 wherein the hydraulic power unit has a plurality of pistons for driving at least one hydraulic load.

14. The electro-hydraulic power unit of claim 13 wherein a first set of pistons are fluidly connected to a first hydraulic load and a second set of pistons are fluidly connected to a second hydraulic load.

15. The electro-hydraulic power unit of claim 1 wherein the suction flow of the hydraulic unit is directed along a path based on operating conditions.

16. The electro-hydraulic power unit of claim 15 wherein the operating condition is the temperature of the power unit.

17. The electro-hydraulic power unit of claim 15 wherein the operating condition is the temperature of the hydraulic oil.

18. The electro-hydraulic power unit of claim 1 wherein the electric machine further comprises a thermostatic expansion element mounted on the stator for diverting suction flow through the rotor-stator gap when the power unit is operating above a selected temperature.

19. The electro-hydraulic power unit of claim 18 wherein the thermostatic expansion element is a solenoid valve.

20. The electro-hydraulic power unit of claim 1 wherein a controller selectively operates the power unit at a reduced power mode when excessive temperatures are detected.

21. The electro-hydraulic power unit of claim 1 wherein a controller selectively operates the power unit at a reduced power mode when excessive temperatures are anticipated.

22. An electro-hydraulic power unit comprising:
   a housing;
   a hydraulic power unit within the housing, said power unit having a mechanical power shaft and said hydraulic unit having a portion received within a bearing housing having tapered side walls;
   an electric machine within the housing adjacent to the hydraulic power unit, said electric machine having a rotor secured to the mechanical power shaft of the hydraulic power unit and a stator press-fit into the housing, wherein there is a rotor-stator gap between the rotor and the stator and a bypass channel between the stator and the housing, wherein the temperature of suction flow through the rotor-stator gap is controlled by directing suction flow through the bypass channel when the power unit is operating below a selected temperature and directing suction flow through the rotor-stator gap when the power unit is operating above the selected temperature.

23. The electro-hydraulic power unit of claim 18 wherein the thermostatic expansion element is a bi-metallic element.

24. The electro-hydraulic power unit of claim 18 wherein the thermostatic expansion element is an embedded piece of wax that deforms with temperature.

* * * * *